United States Patent [19]
Schlueter

[11] Patent Number: 5,490,372
[45] Date of Patent: Feb. 13, 1996

[54] COTTON HARVESTER

[75] Inventor: Francis E. Schlueter, Des Moines, Iowa

[73] Assignee: Deere & Company, Moline, Ill.

[21] Appl. No.: 276,974

[22] Filed: Jul. 19, 1994

Related U.S. Application Data

[60] Continuation-in-part of Ser. No. 189,391, Jan. 26, 1994, Pat. No. 5,394,679, which is a division of Ser. No. 968,691, Oct. 30, 1992, Pat. No. 5,311,728.

[51] Int. Cl.[6] ................................. A01D 46/12
[52] U.S. Cl. .......................... 56/33; 56/DIG. 9
[58] Field of Search ................ 56/1, 28, 30, 33, 56/34, DIG. 9, DIG. 24, 119

[56] References Cited

U.S. PATENT DOCUMENTS

| | | | |
|---|---|---|---|
| 2,963,843 | 12/1960 | Deal | 56/119 |
| 3,638,406 | 2/1972 | Scherer et al. | 56/DIG. 9 X |
| 3,995,412 | 12/1976 | Gaeddert et al. | 56/DIG. 9 X |
| 4,338,770 | 7/1982 | Schlueter | 56/33 |
| 5,191,753 | 3/1993 | Fachini et al. | 56/30 |
| 5,251,427 | 10/1993 | Ulschmid et al. | 56/DIG. 24 X |

OTHER PUBLICATIONS

Deere & Co., 7445 Cotton Stripper Operator's Manual, 5 pages and front cover, dated Mar. 1992, published in the U.S.A.

Primary Examiner—Ramon S. Britts
Assistant Examiner—James A. Lisehora

[57] ABSTRACT

A cotton stripper with an improved row unit having brush rolls and augers with parallel shafts driven by a gear drive. The parallel shafts permit the unit to be narrowed several inches compared with the conventional units. A cut-off member between the brush roll and auger has an edge which runs parallel to the shafts below the axis of the brush roll shaft to break up stalks and facilitate power feeding of stripped material toward the lower part of the auger. The auger housing is formed with angled flat walls for better stalk breakage. The row unit housing includes a light, low friction plastic cover with a quick attach and release mounting arrangement including a rear panel that serves both as a unit drive cover and a hold-down structure for the rear of the plastic cover. The cover includes inner and outer walls separated by a hollow interior for strength, rigidity and noise and weight reduction. The double wall construction also facilitates shaping of the outer wall for funnelling cotton towards the row-receiving area and the inner wall for maintaining stripped cotton within the housing and directing the stripped cotton toward the row unit augers.

18 Claims, 6 Drawing Sheets

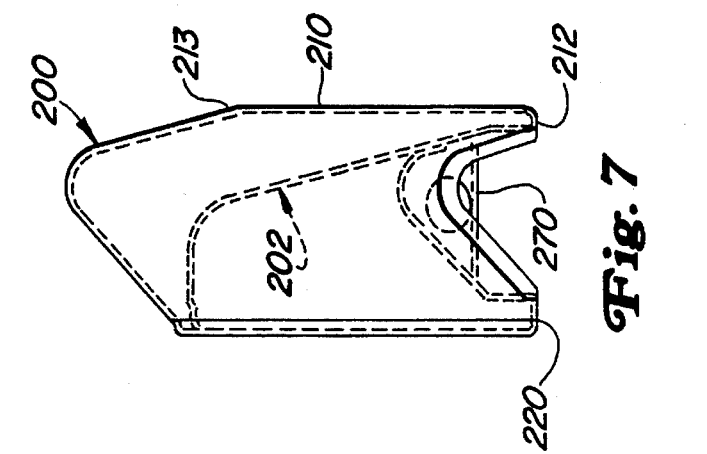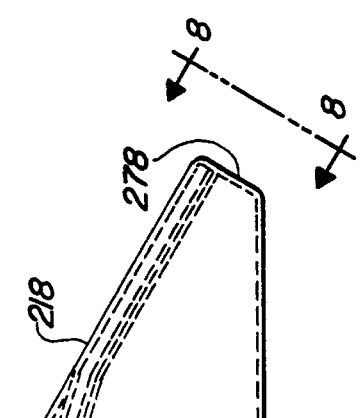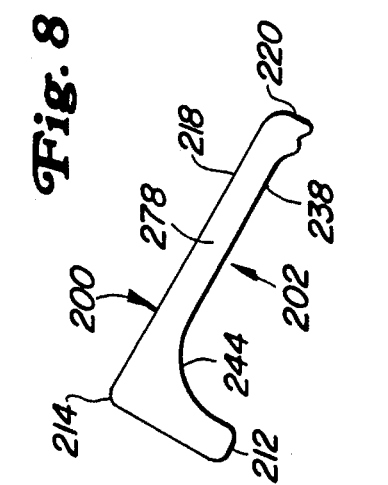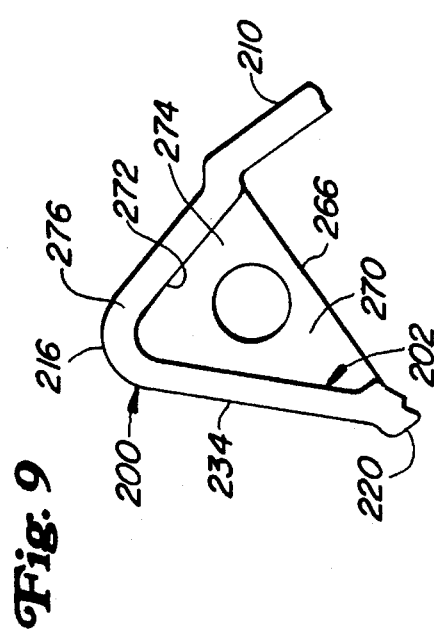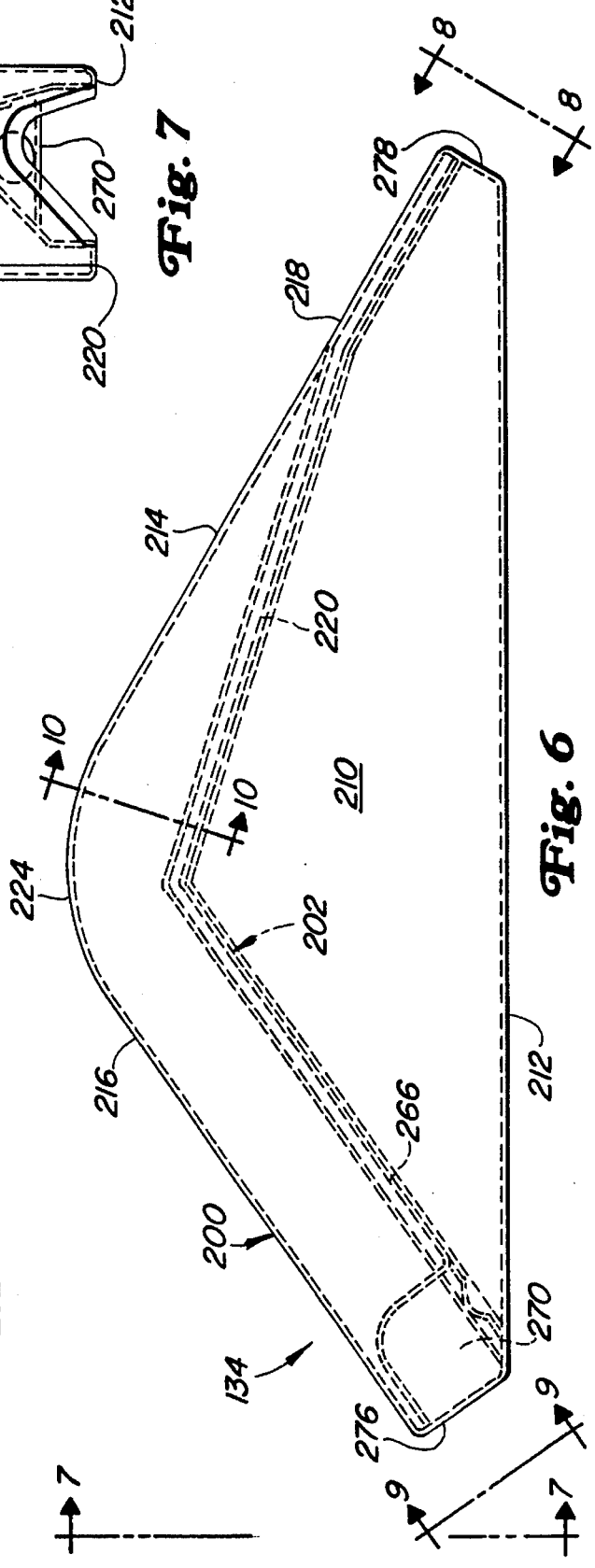

COTTON HARVESTER

This application is a continuation-in-part of application Ser. No. 08/189,391 filed 26 Jan. 1994 (now U.S. Pat. No. 5,394,679), which is a divisional application of application Ser. No. 07/968,691 filed 30 Oct. 1992 (now U.S. Pat. No. 5,311,728).

BACKGROUND OF THE INVENTION

1) Field of the Invention

The present invention relates generally to cotton harvesters such as cotton strippers, and, more specifically, to an improved row unit for such a harvester.

2) Related Art

Presently available cotton strippers such as the John Deere Model 7445 Cotton Stripper include individual row units supported forwardly of a cross-auger frame. Cotton along with cotton stalks and other debris is swept from the row-receiving area by a pair of brush rolls supported on either side of the row of cotton and angling upwardly in the rearward direction. An auger supported above a rounded auger housing outwardly of each of the brush rolls conveys the material rearwardly to the cross auger. The row unit auger shafts are gear driven, and the axes of the brush roll shafts run at an angle to the axes of the auger shafts. The angled shafts cause point contact on the gear teeth and increased noise and wear. With as many as six units running simultaneously, the noise level can be relatively high.

The row unit width in conventional strippers approaches the minimum row spacing in narrow row cotton so that access to the units for servicing is limited. Providing a narrow stripper unit which still has good picking efficiency, minimal cotton loss, and access to the brush roll and conveyor areas for servicing and clearing blockages has been a continuing source of difficulty.

The typical stripper row unit housing includes a painted metal cover which encloses the brush rolls and auger. The cover, fabricated from several pieces of sheet metal, is expensive to manufacture and tends to lose paint where contacted by the cotton plants. The cover has a flat top, and loose cotton can bounce off the top and be lost as the plants enter the row-receiving area. In tall cotton, the upper part of the cotton plant bunches up at upper areas of the stripper brush rolls, and as a result, stripping efficiency is reduced. Removal of the metal cover from the housing to access the strip roll and conveyor areas is difficult and time consuming, in part because of the weight of the metal cover and the need to remove numerous fasteners. The metal cover tends to rattle on its supports and increases the noise level of the row unit.

BRIEF SUMMARY OF THE INVENTION

It is therefore an object of the present invention to provide an improved row unit for a cotton harvester that overcomes most or all of the aforementioned problems. It is a further object to provide such a unit with an improved row unit cover that is lighter, less expensive and easier to remove and attach than at least most previously available row unit covers. It is still another object to provide such a cover which has improved styling.

It is yet another object of the invention to provide an improved row unit for a cotton harvester of the stripper type that has improved cotton handling characteristics compared to at least most previously available cotton stripper row units. It is a further object to provide such a unit improves feeding of high yielding cotton into the brush rolls with less cotton loss than at least most previously available units.

It is a further object to provide an improved row unit for a cotton stripper which has a better drive arrangement and a significantly lower noise level than most previously available units. It is another object to provide such a unit which is easy to access for maintenance, repair, and clearing blockages.

A cotton stripper is constructed with an improved row unit having brush rolls and augers with parallel shafts driven by a gear drive located in an easily accessed area at the rear of the unit. The housing cover which generally closes the row unit is fabricated from plastic. The cover is a unitary structure with double wall construction for strength. In addition, the double wall construction defines inside and outside surfaces of different shapes to optimize plant and cotton flow both on the outside of the unit and within the housing. The top of the row unit housing cover is angled downwardly toward the row-receiving area to help direct loose cotton into the row unit and reduce cotton loss. The plastic surface has a relatively low coefficient of friction so cotton flows into the housing with less resistance.

The front end gathering area of the unit is widened for better funneling action of the plant into the row-receiving area. The improved housing shape along with increased row unit length more evenly distributes the cotton plants along the length of the brush roll for better stripping efficiency.

The cover attaching arrangement includes bracket structure at the front of the plastic cover and near the front of the row unit frame which facilitates easy insertion of the front of the cover into position on the row unit. The rear of the cover then is rotated downwardly to a resting position on rear flanges located near the top of rear panel structure which separates the brush rolls and augers from the roll and auger drive. A movable upper panel which normally closes the compartment area around the roll and auger drive during field operations has a release position allowing the cover to move into the resting position on the flanges. Once the cover is resting on the flanges, the upper panel is moved to its closed position wherein it is secured against the top of the cover to maintain the cover in position on the unit frame. To access the brush and auger roll area and the unit drive compartment, the upper panel is moved from its securing position, and the plastic cover is lifted from the flanges and slid out of the forward bracket. Access to the inside of the row unit is fast, and separate fasteners that can get lost or misplaced are eliminated. At only a fraction of the weight of a conventional metal panel cover, the cover can be removed easily, even in the tight confines of a narrow row harvester. The plastic cover transmits less noise outside the row unit and has less tendency to vibrate and rattle on the supports than previously available metal covers. The plastic double wall construction is also more durable, impact resistant and colorfast than painted metal covers and has a more pleasing appearance than at least most previously available covers.

These and other objects, features and advantages of the present invention will become apparent to one skilled in the art upon reading the following detailed description in view of the drawings.

BRIEF DESCRIPTION OF THE DRAWINGS

FIG. 6 is side view of the row unit cover.

FIG. 7 is a view the front of the cover taken essentially along lines 7—7 of FIG. 6.

FIG. 8 is a view of the rear end portion of the cover taken essentially along lines 8—8 of FIG. 6.

FIG. 9 is a view of the front end portion of the cover taken essentially along lines 9—9 of FIG. 6.

DETAILED DESCRIPTION OF THE DRAWINGS

Figure 1:
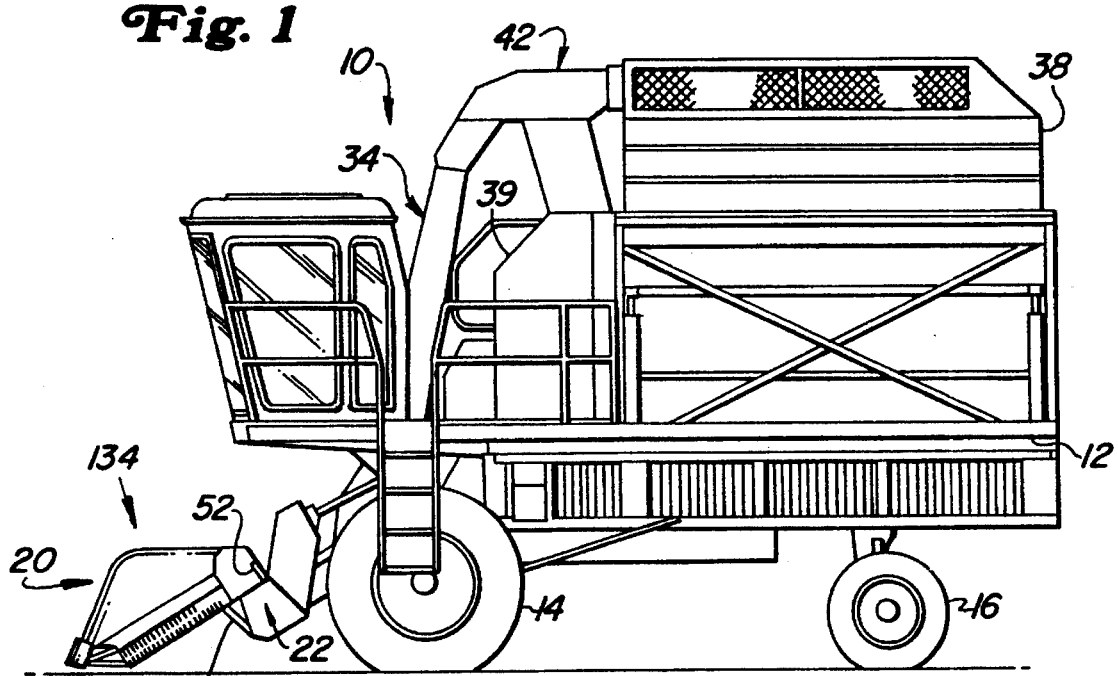
FIG. 1 is a side view of a cotton stripper with the improved row unit of the present invention attached thereto.

Referring now to FIG. 1, therein is shown a cotton harvester 10 of the stripper type having a main frame 12 supported by front drive wheels 14 and rear steerable wheels 16 for forward movement through a field planted with parallel rows of cotton plants. A plurality of stripper row units 20 are supported from a transversely extending cross-auger 22. having a cross auger frame 23 connected by lift arms on the front of the frame 12. The units 20 include stripping structure 26 for removing portions of the cotton plants from the row, and conveying structure 28 for carrying the removed material rearwardly and depositing the material into the cross-auger 22. The cross-auger 22 includes counter-rotating flights for moving the deposited material to a central outlet location at the rear of the auger 22. A dense material separating chamber (not shown) connects the auger outlet with the input to the main upright duct 34 leading to the harvester basket 38 and/or cleaner 39 supported on the frame 12. Material is conveyed by air upwardly and rearwardly to upper grate structure 42 and then rearwardly into the basket 38 or downwardly into the cleaner 39.

Figure 2:
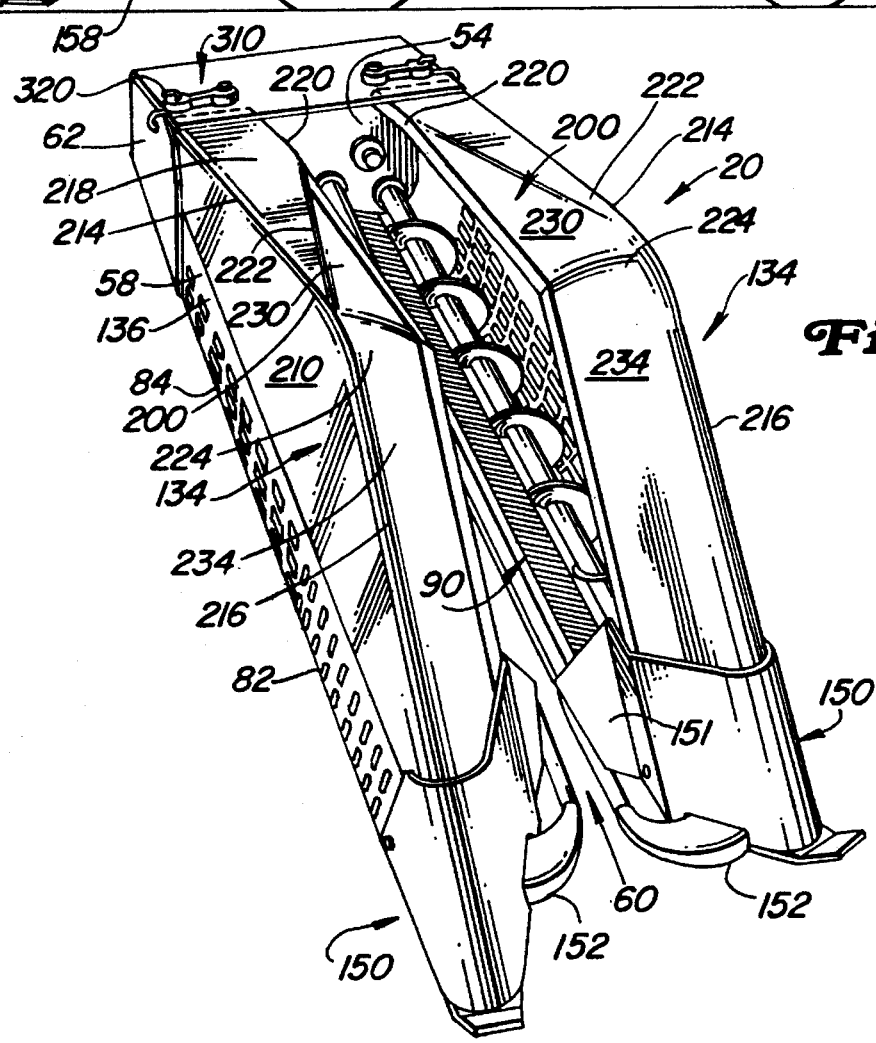
FIG. 2 is a perspective view of one of the row units for the harvester of FIG. 1.
Figure 3:
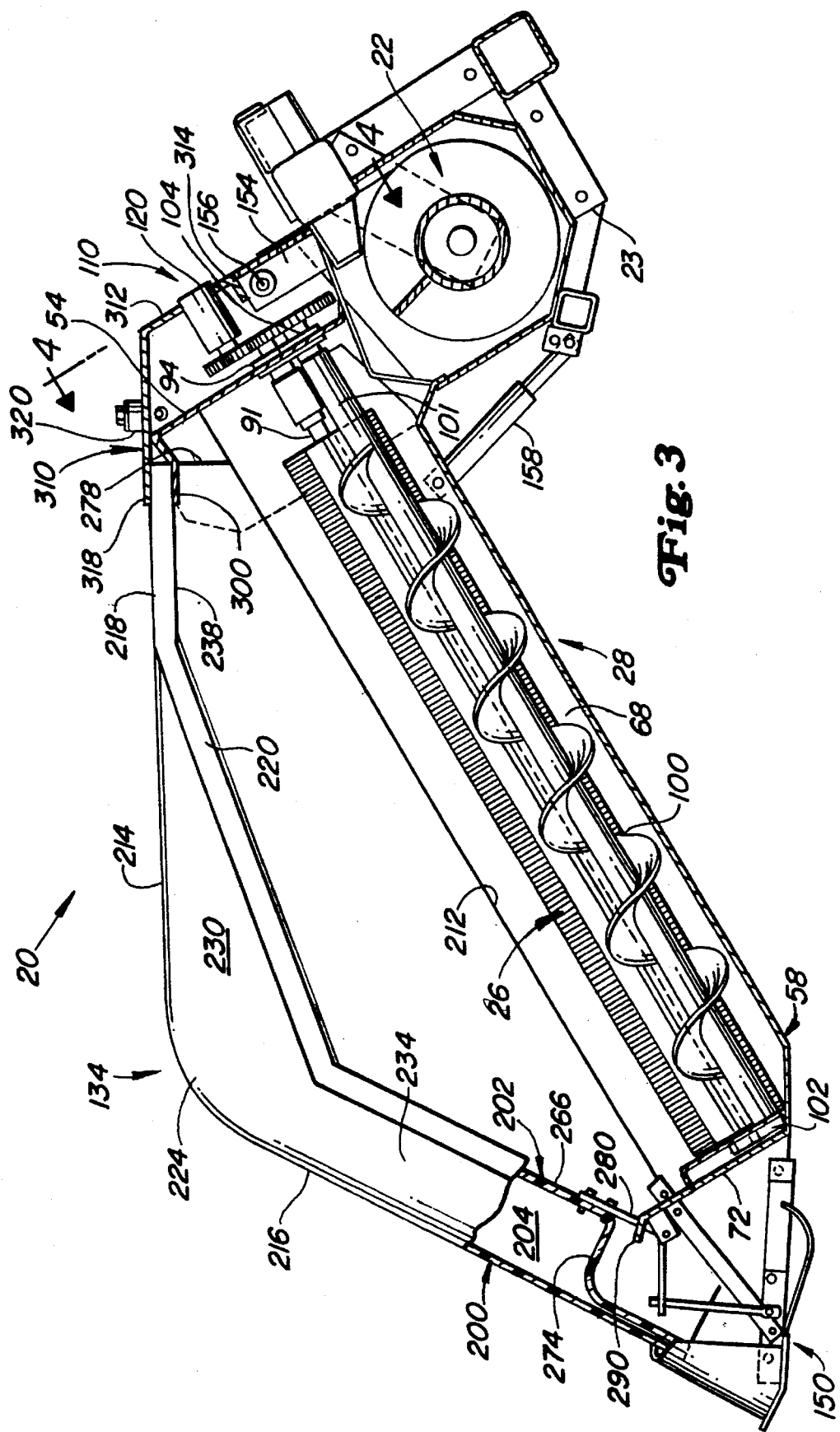
FIG. 3 is a side view, partially in section, of the row unit of FIG. 2 and a portion of the cross-auger.
Figure 4:
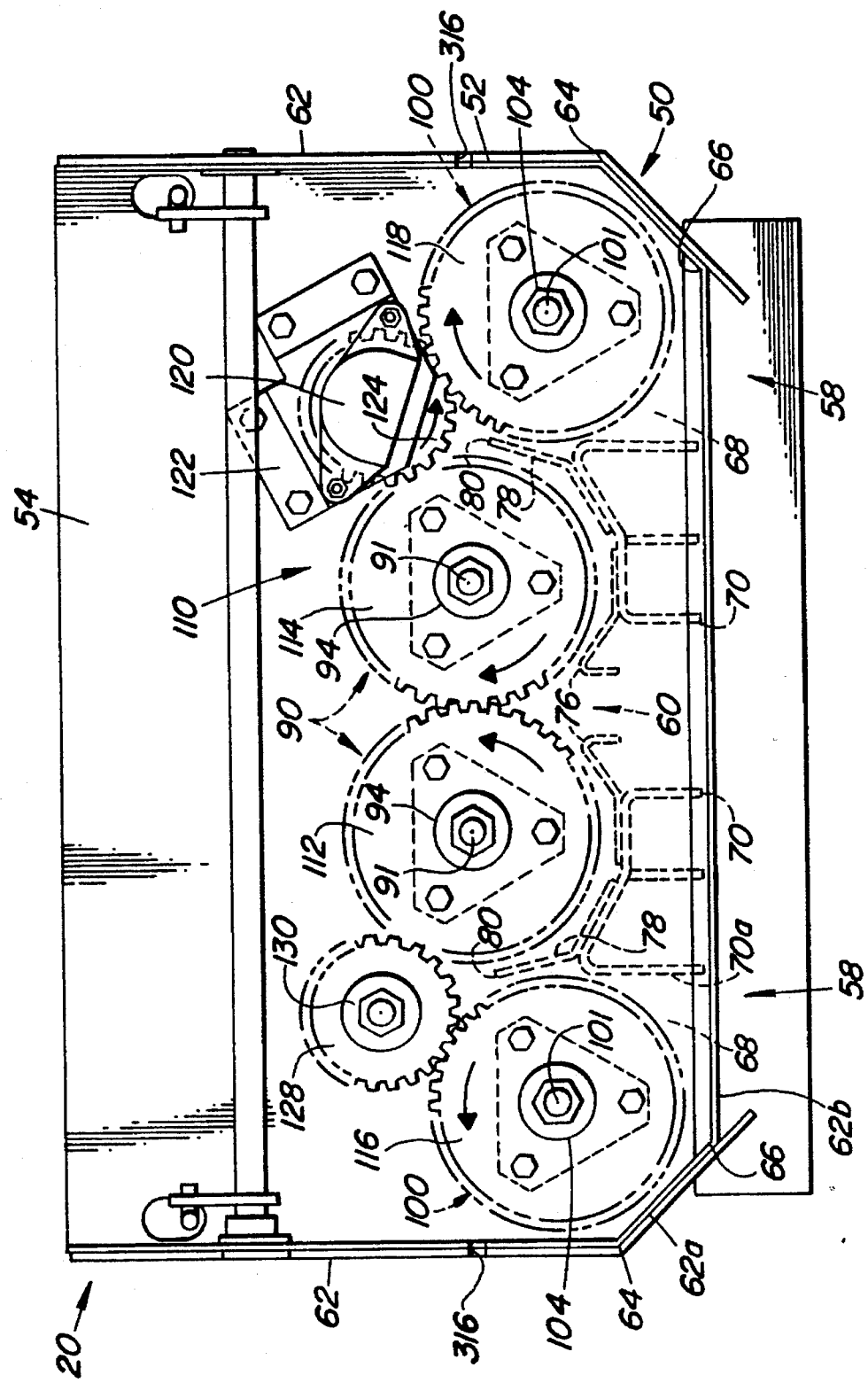
FIG. 4 is a rear view of the row unit of FIG. 2 taken generally along lines 4—4 of FIG. 3 parallel to the axes of rotation of the row unit auger and brush roll shafts, but with the drive area cover removed.

As best seen in FIGS. 2–4, the row unit 20 includes a frame assembly 50 having a rear structural member 52 with an upright transverse panel 54. A pair of transversely spaced supports 58 are cantilevered from the lower portion of the rear structural member 52 and extend forwardly to define a central row-receiving area 60. Each of the supports 58 includes planar side wall 62 which extends vertically to bend location 64 where an angled planar wall 62a (FIG. 4) extends downwardly at an angle of 45° with respect to the wall 62. At a second bend location 66 a planar bottom 62b extends inwardly 45° from the wall 62a to define a flat-walled auger trough area 68. Channel members 70 fixed at their aft ends to the rear structural member 52 extend forwardly on either side of the row-receiving area 60 to front wall structure 72 (FIG. 3). The outermost portion of each of the channel members 70 defines an inside planar wall 70a of the auger trough area 68. Fore-and-aft extending angles 76 are fixed to channel members 70 on either side of the row-receiving area 60. A cut-off member 78 having a straight cut-off edge 80 is fixed to the outermost side of each of the channel members 70 with the edge 80 projecting above the channel member.

Figure 5:
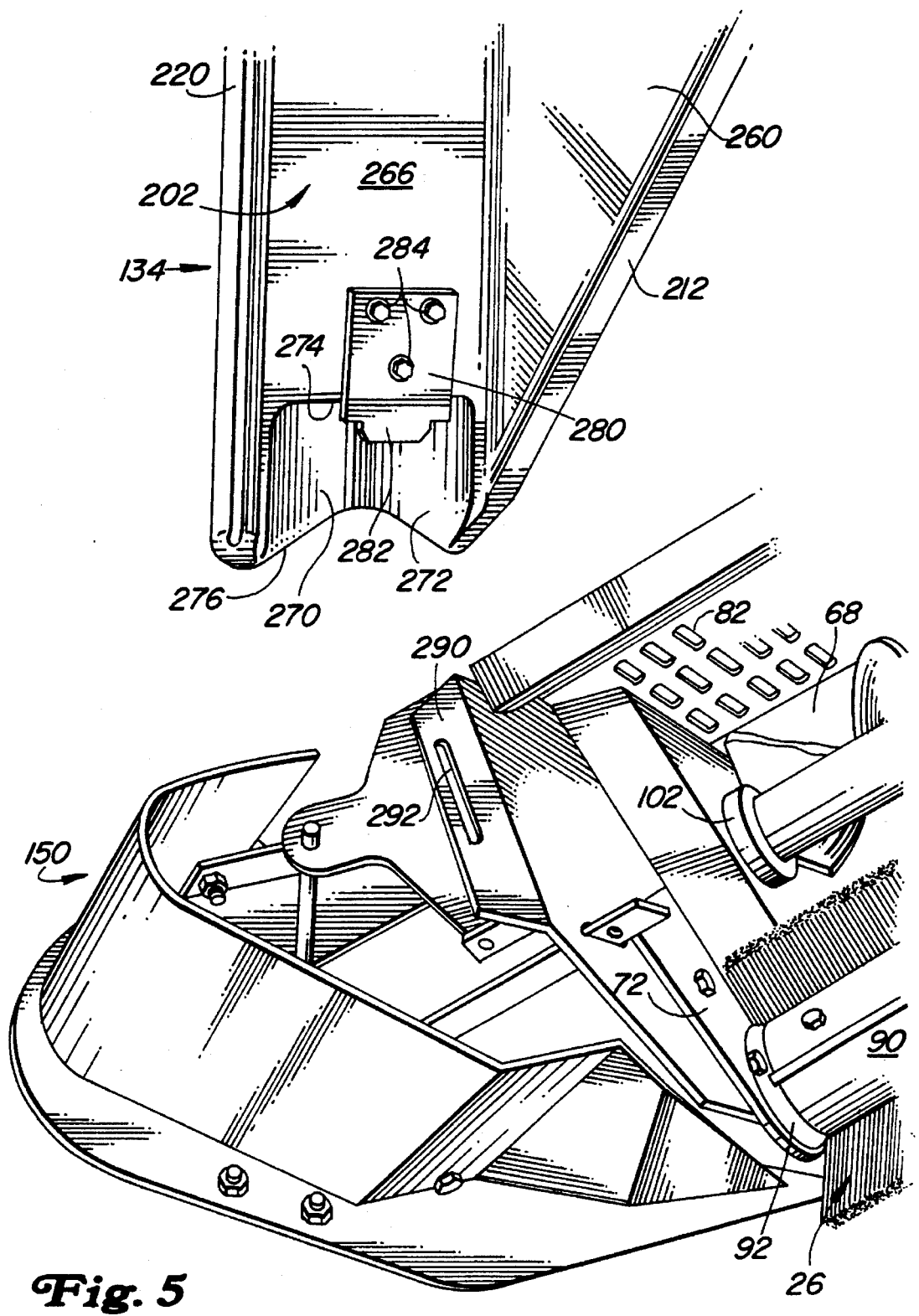
FIG. 5 is an enlarged perspective view of a forward portion of the row unit and cover, with the cover removed and rotated to show the forward mounting bracket structure.
Figure 10:
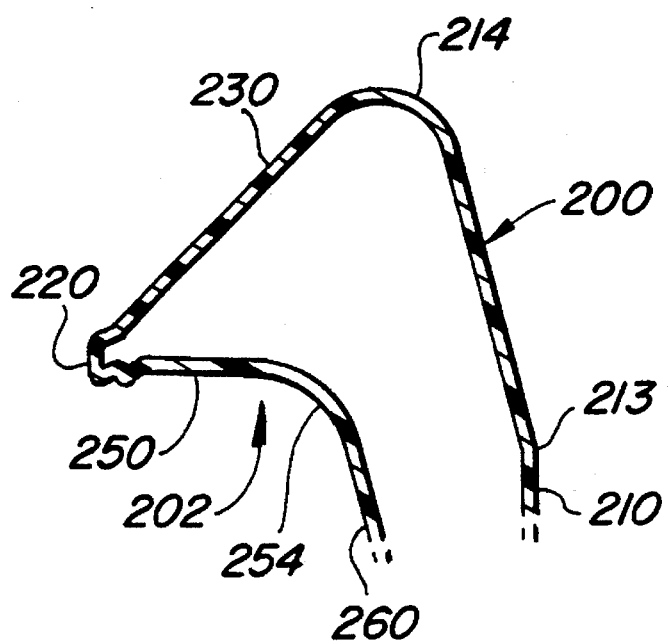
FIG. 10 is a sectional view of the cover of FIG. 6 taken generally along lines 10—10.

Slots 82 (FIG. 5) elongated in a direction perpendicular to the forward direction are formed in the trough walls 62 near the forward end of the unit 20. Slots 84, which are perpendicular to the slots 82 and parallel to the forward direction, are provided rearwardly of the slots 82.

On each side of the row-receiving area 60, a brush or stripper roll 90 is supported for rotation about the axis of a fore-and-aft extending stripper roll shaft 91 by an adjustable forward bearing 92 connected to the front wall structure 72 and by a rear bearing 94 fixed to the rear panel 54. The stripper roll 90 is generally of conventional construction (rows of brushes, or alternating brushes and rubber bats) with the exception that the length of the roll is several inches more than is customary to provide improved stripping in tall, high yield cotton. The shaft 91 projects rearwardly through the panel 54 with the shaft axis substantially perpendicular to the plane of the panel 54. The cut-off edge 80 extends parallel to the axis of the shaft 91 and as best seen in FIGS. 3 and 4 is offset below the shaft axis.

Outwardly of each stripper roll 90, an auger 100 with a shaft 101 is supported for rotation above the corresponding auger trough 68 by a forward bearing 102 fixed to the front wall structure 72, and by a rear bearing 104 supported on the rear panel 54. The auger shaft 101 is substantially parallel to and offset below the stripper roll shaft 91 and the cut-off edge 80 and projects through the rear panel 54. The cut-off edge 80 extends slightly above an imaginary plane which passes through and is parallel to the axes of the shafts 91 and 101.

Stripper roll and auger drive structure 110 includes gears 112, 114 (FIG. 4) fixed to the shafts 91 and gears 116, 118 fixed to the shafts 101 for rotation about parallel axes. The gears 112–118 lie generally in a plane parallel to and offset rearwardly of the rear panel 54. The gear 112 meshes with the gear 114 so that the stripper rolls 90 counter-rotate up from the row-receiving area 60. A hydraulic motor 120 is connected by a bracket 122 to the rear panel 54 and includes a drive gear 124 which meshes with the gears 114 and 118 to drive the right-hand (FIG. 4) stripper roll 90 and auger 100 in the clockwise direction, and the left-hand stripper roll 90 in the counter-clockwise direction. An idler gear 128 supported from the panel 54 by a bearing 130 for rotation about an axis parallel to the auger and stripper roll axes provides counter-clockwise drive from the stripper roll gear 112 to the auger gear 116. The motor 120 is connected to a source of hydraulic fluid under pressure (not shown) on the harvester 10.

Row unit covers 134 (FIGS. 2 and 3) are supported by the row unit frame assembly 50 on either side of the row-receiving area 60 above the supports 58 to funnel cotton plants easily into the row-receiving area 60 and to generally close the housing against loss of removed cotton. The covers 134, which preferably are of double wall molded plastic construction, will be described in further detail below. A forward gathering shoe assembly 150 is pivotally connected to the support 58 for rocking about a generally transverse axis to follow the ground contour. The inner portion of the assembly 150 includes inwardly and upwardly converging plant guides 151 (FIG. 2) for positioning lower portions of the plant with respect to the stripper rolls. Additional lower guides 152 extend inwardly and rearwardly from the front of the unit to channel the lower portion of the cotton plants into the row-receiving area 60.

The row unit 20 is pivotally connected to the cross auger frame 23 by a bracket 154 (FIG. 3) for rocking about an axis 156. A height control cylinder 158 is connected between the lower portion of the row unit frame assembly 50 and the cross auger frame 23 for pivoting the unit about the axis 156. The harvester header which includes the cross auger 22 and row units 20 is connected by conventional hydraulically controlled lift arm structure to the harvester frame 12 for raising and lowering the row units 20.

The Row Unit Cover Construction:

The removable row unit covers 134, which are generally mirror images of each other, each include an outer wall 200 and an inner wall 202 separated by a hollow interior (indicated at 204 in FIG. 3) to provide a strong, low density structure able to withstand rough handling and impacts in the field. The cover 134 is preferably molded as a single unitary structure from a light-weight and durable plastic material with the finish color added to the resin.

The outer wall 200 includes an outer sidewall 210 extending upwardly from a lowermost outer edge 212 and slightly inwardly at location 213 (FIG. 7) to an upper radius or bend location 214 and a forwardly and downwardly directed radius or bend location 216. A top rear portion 218 extends generally horizontally inwardly from the location 214 toward the rear of the row-receiving area 60 and terminates in a cover inside edge 220. Rows of conventional bristles or "cat's whiskers" (not shown) are attached to the inside edge 220 of each cover 134 to span the space between the edges 220 of the covers over the row-receiving area.

A third radius or bend location 222 extends diagonally toward the inside edge 220 from the juncture of the locations 214 and 216 at a knee area 224 where the cover 220 angles downwardly and forwardly toward the gathering shoe assembly 150. A downwardly and inwardly angled surface 230 extends rearwardly from the knee area 224 between the inner edge 220 and the location 222 for funnelling cotton toward the row-receiving area 60. A rearwardly and inwardly sloped forward panel 234 extends from the location 216 to the inner edge 220 to define an upright plant receiving opening near the forward portion of the row-receiving area 60.

As best can be appreciated from FIGS. 6–10, the inner wall 202 has a substantially different shape than the outer wall 200 to contain removed cotton within the harvesting compartment and to direct the cotton towards the augers 100 of the conveying structure 28. An inner wall portion 238 extends generally coextensively with and parallel to the corresponding top rear portion. A bend location 244 is located opposite the location 214 has a substantially larger radius than that of the location 214. A portion 250 of inner wall 202 below the angled surface 230 of the outer wall (FIG. 10) extends slightly downwardly from the inner edge 220 of the cover to a large radius bend location 254 which connects the portion 250 with an inner sidewall portion 260. The inner sidewall portion 260 angles toward the outer sidewall 210 and then extends generally parallel with the sidewall 210 to the lowermost outer edge 212.

At the knee area 224, a forwardly and downwardly sloping and relatively flat inner wall portion 266 extends generally parallel to the location 216 and terminates at a lower cavity area or accommodation space 270 at the forward end of the cover 134. An inner cavity wall 272 is offset from and runs generally parallel to the outer wall 200, and a rear apertured wall 274 defines the rear of the cavity 270. The forward and rearward ends of the cover 134 terminate in edges 276 and 278, respectively.

Several threaded inserts are molded into the lower end of the wall portion 266 adjacent the cavity 270, and a bracket 280 having a tab 282 projecting into the cavity 270 rearwardly of the edge 276 is connected to the portion 266 by bolts 284 screwed into the inserts. A mating bracket receiving structure 290 (FIGS. 3 and 6) extends upwardly and forwardly from the front wall structure 72 and includes a transverse slot 292 for receiving the tab 282 of the bracket 280. The rear transverse panel 54 includes forwardly directed flanges 300 for supporting the aft end of the cover 134. The bracket 280 is first inserted in the slot 292 (FIG. 5), and then the rear of the cover 134 is rotated downwardly until the aft end of the lower inner wall portion 238 rests on the flanges 300 (FIG. 3). A drive cover or panel 310 extends between the walls 62 and includes a rear wall 312 with a lower flange which is received in slots 316 in the walls 62 (FIG. 4). A top portion 318 of the cover 310 projects over the rear edge 278 of the cover 134. Resilient straps 320 bolted to the top portion 318 include end hooks which are received by holes in the sides 62 to secure the top portion against the rear of the cover 134 and maintain both the covers 134 and 310 in position.

To release the covers 134 and 310, the straps 320 are stretched, and the hooks are removed from the holes. Thereafter, the cover 310 is pivoted back or removed to open the top of the unit for access to the drive structure 110. This movement of the cover 310 also releases the rear of the covers 134 to permit the covers 134 to be rocked upwardly and lifted from the bracket receiving structure 290 and completely removed from the remainder of the row unit. Each cover 134 is very light and can be easily lifted from the unit, even when there is little or no working space between the row units. Once the covers 134 and 310 are removed, relatively unimpeded access may be had to the rolls, augers, drives and surrounding areas.

In the field-working operation, the cotton plants enter the row-receiving area 60. The sloped forward panels 234 of the outer wall 200 provide a wide throat area that smoothly channels the plant into the harvesting compartment area. The low friction surfaces 230 sloping downwardly toward the inside of the unit funnels the cotton plants and loose cotton into the compartment. The counter-rotating stripper rolls 90 strip cotton bolls and stalk material from the plants and propel the stripped material over the cut-off member 78 toward the augers 100. The cut-off member 78 prevents cotton from sticking to the adjacent stripper roll 90, and the edge 80 helps break up stalk material. The augers 100 convey the stripped material rearwardly, and the auger housing slots 82 facilitate removal of dirt from the trough area 68. The slots 84 facilitate stalk breakage and removal. The planar angled walls of the auger troughs help assure stalk breakage and help optimize material location in the trough for better conveying and cleaning action. The augers 100 direct the rearwardly conveyed material downwardly through rear openings in the row unit and into the cross-auger 22. The downwardly concave configuration of the inner wall 202 helps direct the stripped material toward the trough area 68.

Having described the preferred embodiment, it will become apparent that various modifications can be made without departing from the scope of the invention as defined in the accompanying claims.

I claim:

1. In a cotton harvester having a main frame supported for forward movement through a field of cotton planted in parallel rows, a row unit for stripping cotton from a row of plants, comprising:

a row unit housing supported by the frame;

first and second fore-and-aft extending stripper rolls supported for rotation in the housing and defining a row-receiving area;

first and second augers offset from the first and second stripper rolls, respectively, for conveying stripped cotton rearwardly;

a roll and auger drive connected to the first and second stripper rolls and the first and second augers; and wherein the housing includes a fore-and-aft extending removable cover structure extending over the stripper rolls and augers, the cover structure comprising a plastic member including an upwardly directed outer wall having a first shape for funnelling cotton plants towards the row-receiving area, and an inner wall located above the augers and having a shape which differs from the first shape for maintaining stripped cotton within the housing and directing the stripped cotton toward preselected locations within the housing.

2. The invention as set forth in claim 1 wherein the row unit includes rear panel structure and the augers and rolls include shafts projecting rearwardly through the rear panel structure and connected to the drive, and an upper movable panel supported from the housing above the drive, the panel movable between a securing position wherein the panel extends over the cover structure and a release position wherein the cover structure may be removed from the housing.

3. The invention as set forth in claim 2 wherein the rear panel structure includes means for biasing the panel into contact with the cover structure.

4. The invention as set forth in claim 2 wherein the panel is removable from the housing for access to the drive.

5. The invention as set forth in claim 1 wherein the plastic cover is fabricated from a lightweight plastic with a low friction surface, and the outer wall includes a top portion which slopes downwardly to funnel loose cotton outside the housing into the housing for reduced cotton loss.

6. The invention as set forth in claim 1 wherein the plastic cover includes a hollow portion separating the inner wall from the outer wall.

7. The invention as set forth in claim 6 wherein the plastic cover includes boltless connecting means for attaching the cover to and removing the cover from the housing.

8. In a cotton harvester having a main frame supported for forward movement through a field of cotton planted in parallel rows, a row unit for stripping cotton from a row of plants, comprising:

a row unit housing supported by the frame;

first and second fore-and-aft extending stripper rolls supported for rotation in the housing and defining a row-receiving area;

first and second augers offset from the first and second stripper rolls, respectively, for conveying stripped cotton rearwardly;

a roll and auger drive connected to the first and second stripper rolls and the first and second augers;

wherein the housing includes a fore-and-aft extending removable cover structure extending over the stripper rolls and augers, the cover structure comprising a plastic member having a double wall construction including an upwardly directed outer wall having a first shape for funnelling cotton towards the row-receiving area, and an inwardly directed inner wall having a shape which differs from the first shape for maintaining stripped cotton within the housing and directing the stripped cotton toward preselected locations within the housing; and including an attaching bracket located at the forward end of the cover structure, and wherein the housing includes a mating forward bracket receiving member, and means for maintaining the bracket in the bracket receiving member when the cover structure is attached.

9. The invention as set forth in claim 8 wherein the means for maintaining the bracket in the bracket receiving member includes movable panel structure located above the rear of the cover structure.

10. The invention as set forth in claim 9 wherein the movable panel structure comprises a drive cover having a covering position for generally enclosing the drive within the housing, and an access position wherein the housing is opened to the drive for service and maintenance, wherein in the covering position, the cover is secured over the aft end of the cover structure.

11. In a cotton harvester having a main frame supported for forward movement through a field of cotton planted in parallel rows, a row unit for stripping cotton from a row of plants, comprising:

a row unit housings supported by the frame;

first and second fore-and-aft extending stripper rolls supported for rotation in the housing and defining a row-receiving area;

first and second augers offset from the first and second stripper rolls, respectively, for conveying stripped cotton rearwardly;

a roll and auger drive connected to the first and second stripper rolls and the first and second augers;

wherein the housing includes a fore-and-aft extending removable cover structure extending over the stripper rolls and augers, the cover structure comprising a plastic member having a double wall construction including an, upwardly directed outer wall having a first shape for funnelling cotton towards the row-receiving area, and an inwardly directed inner wall having a shape which differs from the first shape for maintaining stripped cotton within the housing and directing the stripped cotton toward preselected locations within the housing; and wherein the augers include axes located below the axes of the first and second stripper rolls, respectively, wherein the inner wall includes a surface directing the cotton along the length of the stripper rolls downwardly towards the respective augers.

12. In a cotton harvester having a main frame supported for forward movement through a field of cotton planted in parallel rows, a row unit for stripping cotton from a row of plants, comprising:

a row unit housing supported by the frame;

first and second fore-and-aft extending stripper rolls supported for rotation in the housing and defining a row-receiving area;

first and second augers offset from the first and second stripper rolls, respectively, for conveying stripped cotton rearwardly;

a roll and auger drive connected to the first and second stripper rolls and the first and second augers;

wherein the housing includes a fore-and-aft extending removable cover structure extending over the stripper rolls and augers, the cover structure comprising a plastic member having a double wall construction including an upwardly directed outer wall having a first shape for funnelling cotton towards the row-receiving area, and an inwardly directed inner wall having a shape which differs from the first shape for maintaining stripped cotton within the housing and directing the stripped cotton toward preselected locations within the housing;

wherein the plastic cover includes a hollow portion separating the inner wall from the outer wall; and wherein the outer wall includes a top portion which slopes downwardly to funnel loose cotton outside the housing into the housing and the inner wall includes a surface directing the cotton along the length of the stripper rolls downwardly towards the respective augers for reduced cotton loss.

13. In a cotton harvester having a main frame supported for forward movement through a field of cotton planted in parallel rows, a row unit for stripping cotton from a row of plants, comprising:

a row unit housing supported by the frame;

first and second fore-and-aft extending stripper rolls supported for rotation in the housing and defining a row-receiving area;

first and second augers offset from the first and second stripper rolls, respectively, for conveying stripped cotton rearwardly;

a roll and auger drive connected to the first and second stripper rolls and the first and second augers; and wherein the housing includes a fore-and-aft extending removable cover structure extending over the stripper rolls and augers, the cover structure comprising a plastic member having a double wall construction including an upwardly directed outer wall having a first shape for funnelling cotton towards the row-receiving area, and an inwardly directed inner wall having a shape which differs from the first shape for maintaining stripped cotton within the housing and directing the stripped cotton toward preselected locations within the housing; and wherein the row unit housing includes at least one auger trough extending below the augers and having at least one boundary which is planar and extends generally the length of the augers for facilitating cotton stalk breakage, the auger trough including forwardly located upright slots and fore-and-aft extending slots located rearwardly of the upright slots.

14. In a cotton harvester having a main frame supported for forward movement through a field of cotton planted in parallel rows, a row unit for removing cotton from a row of plants and delivering removed cotton and plant debris rearwardly, a row unit frame assembly supported from the harvester main frame and defining a row-receiving area;

fore-and-aft extending harvesting and conveying structure supported by the frame assembly;

a fore-and-aft extending housing cover removably supported by the frame assembly for generally containing removed cotton in the housing, the housing cover comprising a nonmetallic outer surface sloping inwardly and downwardly toward the row-receiving area and an inner surface located between the outer surface and the harvesting and conveying structure and being generally concave in the downward direction for directing removed cotton towards the conveying structure;

wherein the housing cover comprises a plastic structure having a double wall construction with first and second walls defining the outer and inner surfaces, respectively; and wherein the first end portion includes a first bracket member located therein, and a mating bracket member supported by the frame assembly for receiving the first bracket member, and wherein frame assembly includes means for supporting the second end portion.

15. The invention as set forth in claim 14 wherein the plastic structure comprises a unitary molded plastic member having a generally hollow interior between the first and second walls.

16. The invention as set forth in claim 14 wherein the frame assembly includes a drive support panel, and the means for supporting the second end portion comprises ledge structure connected to the drive support panel, and further including a movable upper panel located above the ledge structure and having a confining position for retaining the second end portion on the ledge structure and a release position for permitting the second end portion to be lifted from the ledge structure to facilitate removal of the plastic member from the frame assembly.

17. Row unit housing structure for a cotton harvester row unit having a fore-and-aft extending frame assembly with a drive support panel and defining a row-receiving area and cotton removing and conveying structure adjacent the row-receiving area, the housing structure comprising:

a unitary plastic member removably connected to the frame assembly above the cotton removing and conveying structure and having an inner wall and an outer wall and first and second fore-and-aft spaced end portions;

the outer wall having a first shape with an upper fore-and-aft extending portion sloping toward the row-receiving area, and a forward upright portion opening towards the row-receiving area;

the inner wall having a second shape differing substantially from the first shape and located generally below but offset from the upper fore-and-aft extending portion, the inner wall being concave in the downward direction; and end portion support structure comprising ledge structure connected to the drive support panel, and further including a movable upper panel located above the ledge structure and having a confining position for retaining the second end portion on the ledge structure with the inner wall above the cotton removing and conveying structure, and a release position for permitting the second end portion to be lifted from the ledge structure to facilitate removal of the plastic member from the frame assembly and thereby provide generally unimpeded access to the cotton removing and conveying structure.

18. The invention as set forth in claim 17 wherein the inner and outer walls are separated by a generally hollow interior space.

* * * * *